(12) United States Patent
Schacherer et al.

(10) Patent No.: US 12,385,149 B2
(45) Date of Patent: Aug. 12, 2025

(54) ELECTROLYSIS SYSTEM FOR BREAKING DOWN WATER INTO HYDROGEN AND OXYGEN, AND A METHOD FOR OPERATING THE ELECTROLYSIS SYSTEM

(71) Applicant: Siemens Energy Global GmbH & Co. KG, Bayern (DE)

(72) Inventors: Christian Schacherer, Bayern (DE); Erik Wolf, Röttenbach (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 508 days.

(21) Appl. No.: 17/777,099

(22) PCT Filed: Oct. 15, 2020

(86) PCT No.: PCT/EP2020/079046
§ 371 (c)(1),
(2) Date: May 16, 2022

(87) PCT Pub. No.: WO2021/104744
PCT Pub. Date: Jun. 3, 2021

(65) Prior Publication Data
US 2023/0031617 A1 Feb. 2, 2023

(30) Foreign Application Priority Data
Nov. 28, 2019 (EP) .................................. 19212114

(51) Int. Cl.
*C25B 9/77* (2021.01)
*C25B 1/04* (2021.01)
(Continued)

(52) U.S. Cl.
CPC .................. *C25B 9/77* (2021.01); *C25B 1/04* (2013.01); *C25B 9/65* (2021.01); *C25B 15/02* (2013.01)

(58) Field of Classification Search
CPC ..................................................... C25F 9/65
See application file for complete search history.

(56) References Cited

U.S. PATENT DOCUMENTS 4,075,448 A * 2/1978 Seedorf ...................... C25B 9/66
200/5 B
4,390,763 A * 6/1983 Hruda ........................ C25B 9/66
204/267

(Continued)

FOREIGN PATENT DOCUMENTS

CN 1219609 A 6/1999
CN 101565832 A 10/2009

(Continued)

OTHER PUBLICATIONS

Stark, Paulo Ricardo; Basics of low-voltage switching technology. Sirius—Sentron—Sivacon; "Grundlagen der Niederspannungs-Schalttechnik"; Sirius—Sentron—Sivacon; pp. 1-1038; XP055638241; Found on Internet: URL: https://support.industry.siemens.com/cs/document/34973099/grundlagen-der-niederspannungs-schalttechnik?dti=0&lc-de-WW; [gefunden am Nov. 1, 2019]; pp. 26-11-pp. 26-12; 2008.

(Continued)

*Primary Examiner* — Harry D Wilkins, III
(74) *Attorney, Agent, or Firm* — Wolter Van Dyke Davis, PLLC

(57) ABSTRACT

An electrolysis system for breaking down water into hydrogen and oxygen using at least two electrolysis modules, each electrolysis module having at least two electrolytic cells, an electrolytic cell having an anode compartment and a cathode compartment, the anode compartment being separated from the cathode compartment by a proton exchange membrane, and a switching device, which is compatible with direct current, being arranged electrically in parallel with at least one electrolysis module. The electrolysis system is operated (Continued)

by the at least two electrolysis modules. When the available electrical power decreases, at least one switching device is closed. At least one electrolysis module is bridged by the switching device. The number of electrolysis modules which are then operated is reduced by the number of bridged electrolysis modules. When the available electrical power increases, at least one switching device is opened.

14 Claims, 1 Drawing Sheet

(51) Int. Cl.
  *C25B 9/65* (2021.01)
  *C25B 15/02* (2021.01)

(56) References Cited

U.S. PATENT DOCUMENTS

| | | | |
|---|---|---|---|
| 4,589,966 A | 5/1986 | Ford | |
| 6,036,827 A * | 3/2000 | Andrews | F01N 3/32 |
| | | | 204/266 |
| 6,054,025 A | 4/2000 | Moriguchi | |
| 2006/0065302 A1* | 3/2006 | Gibson | C25B 15/02 |
| | | | 136/291 |
| 2009/0134039 A1 | 5/2009 | Matthews | |
| 2011/0042228 A1* | 2/2011 | Hinatsu | C25B 1/04 |
| | | | 204/258 |
| 2015/0211131 A1 | 7/2015 | Jacobs | |
| 2016/0060776 A1 | 3/2016 | Kawajiri et al. | |
| 2016/0281248 A1* | 9/2016 | Hahn | C25B 15/00 |
| 2017/0175277 A1 | 6/2017 | Von Olshausen | |
| 2017/0321329 A1 | 11/2017 | Spurgeon | |
| 2021/0175533 A1 | 6/2021 | Wolf | |

FOREIGN PATENT DOCUMENTS

| | | |
|---|---|---|
| CN | 104214019 A | 12/2014 |
| CN | 104769160 A | 7/2015 |
| CN | 106460207 A | 2/2017 |
| DE | 2513975 A1 | 10/1976 |
| DE | 19853458 A1 | 5/1999 |
| EP | 3489393 A1 | 5/2019 |
| JP | 2006299390 A | 11/2006 |
| JP | 2015088320 A | 5/2015 |
| JP | 2015191693 A | 11/2015 |
| KR | 20130030847 A | 3/2013 |
| WO | 2016012061 A1 | 1/2016 |
| WO | 2018066939 A1 | 4/2018 |

OTHER PUBLICATIONS

PCT International Search Report and Written Opinion of International Searching Authority mailed Dec. 7, 2020 corresponding to PCT International Application No. PCT/EP2020/079046 filed Oct. 15, 2020.

* cited by examiner

ELECTROLYSIS SYSTEM FOR BREAKING DOWN WATER INTO HYDROGEN AND OXYGEN, AND A METHOD FOR OPERATING THE ELECTROLYSIS SYSTEM

CROSS REFERENCE TO RELATED APPLICATIONS

This application is the US National Stage of International Application No. PCT/EP2020/079046 filed 15 Oct. 2020, and claims the benefit thereof. The International Application claims the benefit of European Application No. EP19212114 filed 28 Nov. 2019. All of the applications are incorporated by reference herein in their entirety.

FIELD OF INVENTION

The present invention relates to an electrolyser for decomposition of water to afford hydrogen and oxygen and to a process for operating the electrolyzer.

BACKGROUND OF INVENTION

An electrolyser is an apparatus that uses electrical current to bring about a transformation of matter (electrolysis). The variety of different electrolyses is reflected by the multiplicity of electrolyzers in existence, for example an electrolyzer for hydrogen electrolysis.

Current thinking favors using energy from renewable energy sources during sunny and windy periods, i.e. periods with above-average solar or wind power generation, to produce value products. One such value product may in particular be hydrogen which is produced using water electrolyzers. The hydrogen can be used to produce so-called EE gas.

This comprises initially producing hydrogen using electrical energy, in particular from wind energy or solar energy, in a (hydrogen electrolysis) electrolyzer. The hydrogen is then used, together with carbon dioxide, to produce methane in a Sabatier process. The methane can then be introduced into an already present natural gas network and thus allows storage and transport of energy to the consumer and can thus relieve an electrical grid. Alternatively, the hydrogen generated by the electrolyser can also be used directly, for example for a fuel cell.

In an electrolyzer for hydrogen electrolysis, water is decomposed into hydrogen and oxygen. In a PEM electrolyser, distilled water is typically supplied on the anode side and split into hydrogen and oxygen at a proton-exchange membrane (PEM). The water is oxidized to oxygen at the anode. The protons pass through the proton-exchange membrane. Hydrogen is produced on the cathode side. An electrolysis unit typically comprises at least four electrolysis modules. An electrolysis module typically comprises 50 electrolytic cells.

The availability of energy from renewable energy sources is not constant as a consequence of weather conditions. PEM electrolyzers may be operated at partial load in the case of a lower electrical power available for the electrolysis. However, this disadvantageously has the result that the operating temperature of the PEM electrolyzer falls. Furthermore, partial-load operation of the electrolysis cells increases aging of the electrolysis cells which disadvantageously results in more frequent maintenance of the electrolysis cells. Partial-load operation of the electrolysis cells can disadvantageously also results in a changing composition of the product gases from the electrolysis.

SUMMARY OF INVENTION

It is accordingly an object of the present invention to specify an electrolysis system and a process for operating an electrolysis system which may be operated at partial load and overcomes the abovementioned disadvantages.

The invention is achieved with an electrolysis system and a process according to the claims.

The electrolysis system according to the invention for decomposition of water to afford hydrogen and oxygen comprises at least two electrolysis modules. Each electrolysis module comprises at least two electrolysis cells. An electrolysis cell comprises an anode space and a cathode space, wherein the anode space is separated from the cathode space by a proton-exchange membrane. At least one direct current-capable switching apparatus is electrically connected in parallel to at least one electrolysis module.

The process according to the invention for operating an electrolysis system for decomposition of water to afford hydrogen and oxygen comprises a plurality of steps. Initially at least two electrolysis modules are provided, wherein each electrolysis module comprises at least two electrolysis cells. An electrolysis cell comprises an anode space and a cathode space. The anode space is separated from the cathode space by a proton-exchange membrane. A direct current-capable switching apparatus is arranged electrically in parallel with at least one electrolysis module. The at least two electrolysis modules are operated using electrical current. In the case of a fall in an electrical current available for the electrolysis at least one switching apparatus is closed. The at least one electrolysis module is bridged by the at least one switching apparatus. Subsequently the electrolysis system is operated, wherein the number of operated electrolysis modules is reduced by the number of bridged electrolysis modules. In the case of an increase in the electrical power available for the electrolysis at least one switching apparatus is in turn opened.

In the bridging of at least one electrolysis module advantageously makes it possible to operate the electrolysis system at partial load without operating individual electrolysis modules at partial load. The current density through the remaining electrolysis modules that are operated remains high, thus preventing operation of these individual electrolysis modules at partial load, i.e. at low current density. This electrolysis system advantageously prevents premature aging of the electrolysis cells in the individual electrolysis modules due to partial-load operation. The electrolysis modules remaining in operation advantageously prevent cooldown of the overall electrolysis system. Product quality also advantageously remains constant since an individual electrolysis module can be operated at an unchanged current density and thus at a constant hydrogen production rate.

In an advantageous embodiment and development of the invention the electrolysis cells are electrically connected in series and the electrolysis modules are also electrically connected in series. The electrolysis modules may be combined to form a stack. The power of such a stack may advantageously be adapted as required by connecting the electrolysis modules in series. A stack especially comprises an electrolysis system having a power in the range from 1 to 50 MW.

In a further advantageous embodiment and development of the invention a pressure plate is arranged between two electrolysis modules. The pressure plate is electrically connected to the electrolysis modules. The individual electrolysis cells are pressed together. The pressing together of the individual membrane layers of the individual electrolysis cells is advantageously carried out with pressure plates. Typically 50 to 300 proton exchange membrane layers (PEM layers) are pressed together. The pressure plates advantageously allow the pressing together of a plurality of electrolysis cells to form an electrolysis module. A plurality of electrolysis modules may in turn be combined to from a stack by serially connecting the electrolysis modules with pressure plates therebetween. The use of the pressure plates thus allows combination of a flexible number of electrolysis modules to form an electrolysis system.

In an advantageous embodiment and development of the invention the switching apparatus is electrically connected to two pressure plates which delimit at least one electrolysis module. The at least one electrolysis module can thus advantageously be bridged by closing the switching apparatus. Connection of the switching apparatus may be simply realized via connection to the pressure plates.

In a further advantageous embodiment and development of the invention the switching apparatus in a closed state has a lower electrical resistance than the electrolysis module. Electricity thus advantageously flows through the closed switching apparatus, with the result that individual electrolysis modules are electrically bridged at times when little electrical current is available. Low-inductance power transmission is moreover advantageous for commutation of the electrical current from the switch back into the module.

In a further advantageous embodiment and development of the invention the switching apparatus is in the form of an encapsulated switching apparatus. A switching apparatus is considered encapsulated here if it is surrounded by a shell which encloses arcs in an insulated volume. The switching apparatus is particularly advantageously a vacuum interrupter or a live tank or a dead tank as employed in high-voltage technology. The use of encapsulated switching apparatuses advantageously avoids the formation of arcs in an environment at risk of explosion, especially comprising hydrogen. The use of the encapsulated switching apparatus thus increases the safety of the electrolysis system.

In a further advantageous embodiment and development of the invention opening the switching apparatus commutates the direct current flow from the switching apparatus into the electrolysis module. The switching of the current flow advantageously brings the electrolysis module, which was previously bridged, back online.

In a further advantageous embodiment and development of the invention the switching apparatus is operated with an arc voltage of at least 100 V, in particular of at least 120 V, during commutation. The electrical current in the switching apparatus or in an electrolysis module is advantageously in a range from 2 kA to 10 kA. This advantageously makes it possible to bridge the current of an electrolysis module comprising up to 30 electrolysis cells, particularly advantageously up to 300 electrolysis cell.

In a further advantageous embodiment and development of the invention a plurality of switching paths for bridging a module are connected in series. This advantageously increases the arc voltage. This comprehends concepts with arc splitters for splitting an arc to increase the arc voltage. Yet further processes which result in an increase in arc voltage include in particular influencing via magnetic fields, mechanical constriction of the arc, lengthening of the arc or cooling of the arc.

In a further advantageous embodiment and development of the invention a low-ohm resistor or a diode in the forwards direction is connected in series with the switching element. The polarity and a protective voltage for the stack are thus advantageously maintained.

In a further advantageous embodiment and development of the invention at least two electrolysis modules are bridged with a switching apparatus which is arranged in parallel with the electrolysis modules. If further modules are to be bridged an additional four modules are bridged. The advantageous system for bridging the modules is the binary series $2^n$ (1 module, 2 modules, 4 module, 8 modules etc.) The number of switching apparatuses may thus advantageously be reduced.

Further features properties and advantages of the present invention are apparent from the following description making reference to the accompanying figures.

DETAILED DESCRIPTION OF INVENTION

Figure 1:
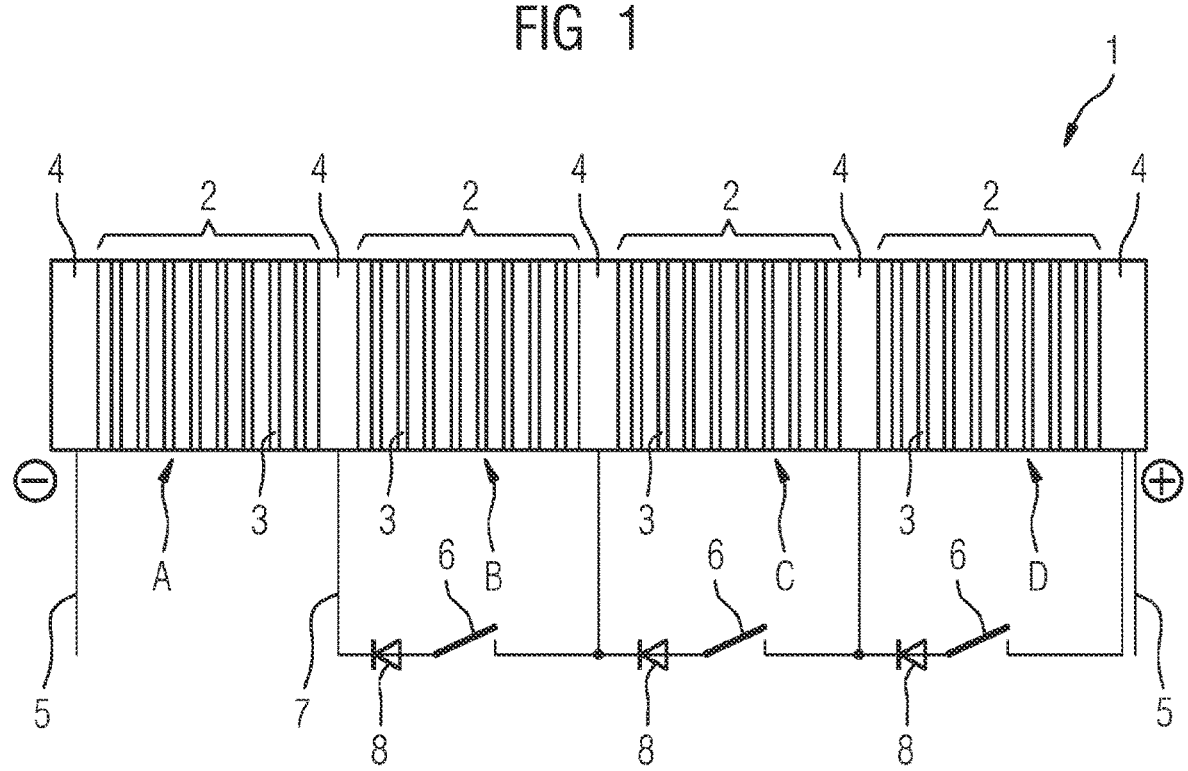
FIG. 1 is a schematic diagram of an electrolysis system comprising four electrolysis modules with three switching apparatuses in an open position.

FIG. 1 shows an electrolysis system 1 comprising four electrolysis module 2. Each electrolysis module 2 comprises a plurality of electrolysis cells 3. The electrolysis cells 3 are arranged between two pressure plates 4. The pressure plates 4 press the electrolysis cells, which especially comprise a proton exchange membrane, together. The pressure plates 4 arranged at the edge of the electrolysis system 1 are electrically connected via an electrical connection 5. The electrolysis modules B, C and D of the electrolysis system 1 have three switching apparatuses 6 arranged in parallel with them. The switching apparatuses 6 are electrically connected in parallel to the electrolysis modules 2. In this example is switching apparatus 6 bridges and electrolysis module 2. Accordingly every switching apparatus 6 is electrically connected to the pressure plates 4 which delimit an electrolysis module 2.

In this example the electrolysis, in particular the decomposition of water to afford hydrogen and oxygen, is carried out in all electrolysis modules 2 since all switching apparatuses 6 are open. The electrolysis is carried out with direct current. The switching apparatuses 6 are therefore in the form of direct current switching apparatuses. A diode 8 is serially connected in the forward direction to the switching element. The polarity and a protective voltage for the stack are thus advantageously maintained.

In this example the electrolysis system 1 is operated under full load. If the electrical power in the grid decreases, especially as a result of little wind and little sunshine, at least one switching apparatus 6 may be closed. This allows the electrolysis modules B, C and D to be modularly switched off/bridged. In this example the electrolysis module A is always operated during operation of the electrolysis system 1. If the other modules are now switched off as a function of the available electrical power, the electrolysis module A may be operated at a constant power density. Accordingly and advantageously, no electrolysis modules/electrolysis cells 3 are operated at partial load. It is particularly advantageous to bridge the electrolysis modules one after another. In particular, module D may initially be bridged for a specified duration. Module B or module C may subsequently be bridged for a similar duration. This ensures that the modules are uniformly operated and subjected to uniform load. The bridging prevents rapid aging of the electrolysis cells 3. It is further ensured that the quality of the product gas, in particular of the hydrogen, remains constant.

Figure 2:
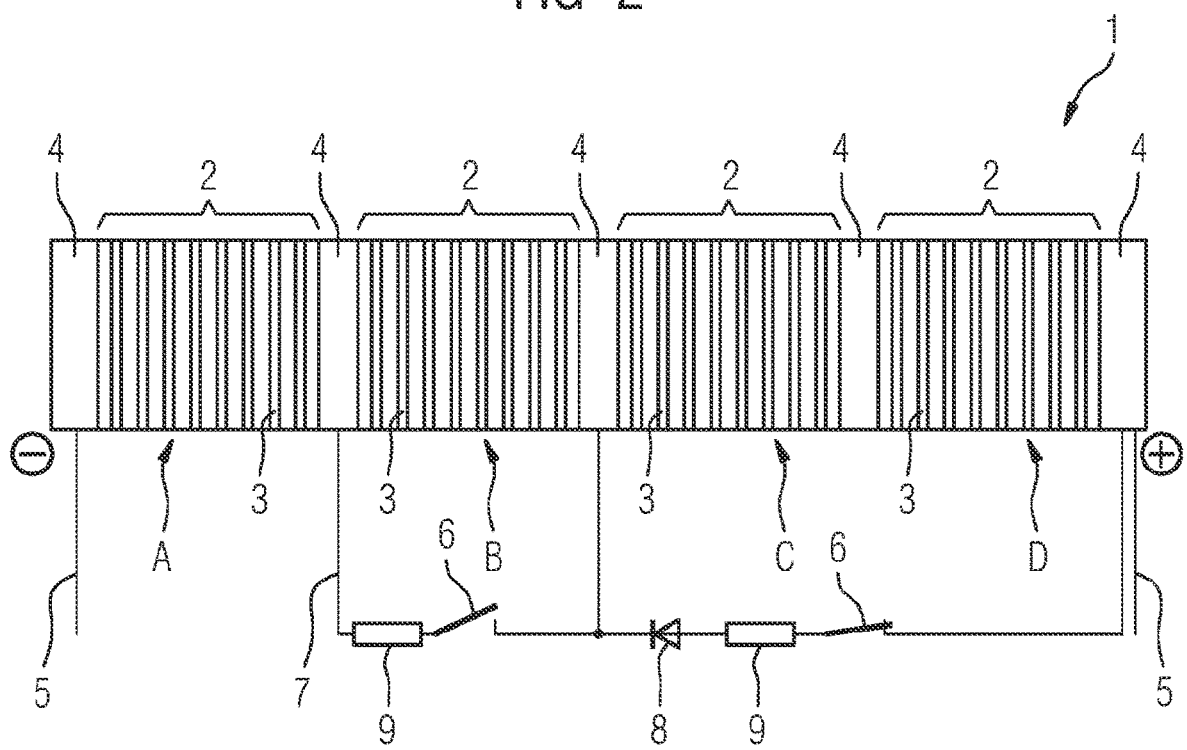
FIG. 2 is an electrolysis system comprising four electrolysis modules with two switching apparatuses, one in the open position and one in the closed position.

FIG. 2 likewise shows an electrolysis system 1 having four electrolysis modules 2. The electrolysis modules are in turn delimited by pressure plates 4, wherein the pressure plates 4 press the electrolysis cells 3 together. In this example two switching apparatuses 6 are arranged in parallel with the electrolysis module 2. A switching apparatus 6 is arranged in parallel with the electrolysis module B. A further switching apparatus is arranged in parallel with the electrolysis modules C and D. A low-ohm resistor 9 is connected in series with the switching element. A further low-ohm resistor 9 is connected in series with a diode 8. It is likewise possible to employ only low-ohm resistors 9 without diode 8. The polarity and a protective voltage for the stack are advantageously maintained by means of the diode and/or the low-ohm resistor.

The switching apparatus 6 which bridges the electrolysis modules C and D is closed in this example. Thus in this example the electrolysis system is operated at partial load. The electrolysis modules A and B are each operated at constant electrical power. Partial load operation is achieved by closing the switching apparatus 6 to effect electrical bridging of the electrolysis modules C and D. If the available electrical power in the electrical grid increases again, the switching apparatus 6 may in turn be opened. The switching apparatus 6 is particularly advantageously in the form of a vacuum tube, in particular in the form of a low-voltage vacuum tube. Also suitable but not shown in the drawing are encapsulated gas switching paths analogous to a live tank or dead tank, such as are employed in high-voltage technology. This prevents an open arc being formed upon commutation of the current. This is desirable since gases at risk of explosion, in particular hydrogen, are formed in the electrolysis modules.

Both exemplary embodiments show four electrolysis modules 2. This is a simplified representation. It is likewise within the spirit of the invention for a greater number of electrolysis modules to be serially connected. It is likewise possible to arrange further staggered arrangements of the switching apparatuses 6 in order on the one hand to provide a sufficient quantity of switching apparatuses 6 and on the other hand to prevent too great a quantity of switching apparatuses 6.

Although the invention has been more particularly illustrated and described in detail via working examples the invention is not limited by the disclosed examples. Variations thereof may be derived by those skilled in the art without departing from the scope of protection of the invention such as is defined by the claims which follow.

LIST OF REFERENCE NUMERALS

1 Electrolysis system
2 Electrolysis module
3 Electrolysis cell
4 Pressure plate
5 Electrical connection
6 Switching apparatus
7 Electrical conduit
8 Diode
9 Electrical resistor
A Electrolysis module A
B Electrolysis module B
C Electrolysis module C
D Electrolysis module D

The invention claimed is:

1. An electrolysis system for decomposition of water to afford hydrogen and oxygen, comprising:
   at least three electrolysis modules,
   wherein each electrolysis module comprises at least two electrolysis cells,
   at least four pressure plates, wherein each pressure plate is separated from a nearest adjacent pressure plate by one electrolysis module of the at least three electrolysis modules,
   wherein each electrolysis cell comprises an anode space and a cathode space and the anode space is separated from the cathode space by a proton-exchange membrane,
   wherein at least one direct current-capable switching apparatus is arranged electrically in parallel with at least one electrolysis module and wherein the switching apparatus in a closed state has a lower electrical resistance than the electrolysis module,
   wherein a pair of electrolysis modules of the at least three electrolysis modules are arranged electrically connected in series end to end with each other, and
   wherein only one direct current-capable switching apparatus of the at least one direct current-capable switching apparatus is arranged electrically in parallel with the pair of electrolysis modules and is thereby effective to bridge the pair when closed.

2. The electrolysis system as claimed in claim 1,
   wherein the at least two electrolysis cells are arranged electrically connected in series.

3. The electrolysis system as claimed in claim 1,
   wherein the at least three electrolysis modules are arranged electrically connected in series.

4. The electrolysis system as claimed in claim 1,
   wherein each pressure plate is electrically connected to respective adjacent electrolysis modules.

5. The electrolysis system as claimed in claim 4,
   wherein the switching apparatus is electrically connected to two pressure plates which delimit at least one electrolysis module therebetween.

6. The electrolysis system as claimed in claim 1,
   wherein the switching apparatus comprises an encapsulated switching apparatus.

7. The electrolysis system as claimed in claim 1,
   wherein the switching apparatus comprises a vacuum interrupter.

8. The electrolysis system as claimed in claim 1,
   wherein all of the at least three electrolysis modules comprise the same number of electrolysis cells.

9. The electrolysis system as claimed in claim 1,
   further comprising a diode serially electrically connected in a forward direction between a selected switching element and a respective module to which the selected switching element is electrically connected.

10. The electrolysis system as claimed in claim 9,
    further comprising a resistor serially electrically connected in the forward direction between the selected switching element and the diode.

11. A process for operating an electrolysis system for decomposition of water to afford hydrogen and oxygen, comprising:
    providing at least three electrolysis modules that are arranged electrically connected in series, wherein each electrolysis module comprises at least two electrolysis cells, providing at least four pressure plates, wherein each pressure plate is separated from a nearest adjacent pressure plate by one electrolysis module of the at least three electrolysis modules, wherein each electrolysis cell comprises an anode space and a cathode space and the anode space is separated from the cathode space by a proton-exchange membrane, wherein at least one direct current-capable switching apparatus is arranged electrically in parallel with at least one electrolysis module and wherein the switching apparatus in a closed state has a lower electrical resistance than the electrolysis module, wherein in a pair of electrolysis modules of the at least three electrolysis modules are arranged electrically connected in series end to end with each other, wherein only one direct current-capable switching apparatus of the at least one direct current-capable switching apparatus is arranged electrically in parallel with the pair of electrolysis modules and is thereby effective to bridge the pair when closed, operating the at least three electrolysis modules, closing the at least one switching apparatus in case of a fall in available electrical power and bridging at least one electrolysis module via the switching apparatus, operating a number of electrolysis modules which is reduced by a number of bridged electrolysis modules, and opening at least one switching apparatus in case of an increase in the available electrical power.

12. The process as claimed in claim 11,
wherein opening the switching apparatus commutates direct current flow from the switching apparatus into the electrolysis module.

13. The process as claimed in claim 12,
wherein the switching apparatus is operated with an arc voltage of at least 100 V during commutation.

14. The process as claimed in claim 11,
wherein electrical current in the switching apparatus or in an electrolysis module is in a range from 2 kA to 10 kA.

* * * * *